(No Model.)
W. A. BOND.
SIPHON OR SPIGOT EXTENSION OR SHANK.
No. 366,070. Patented July 5, 1887.
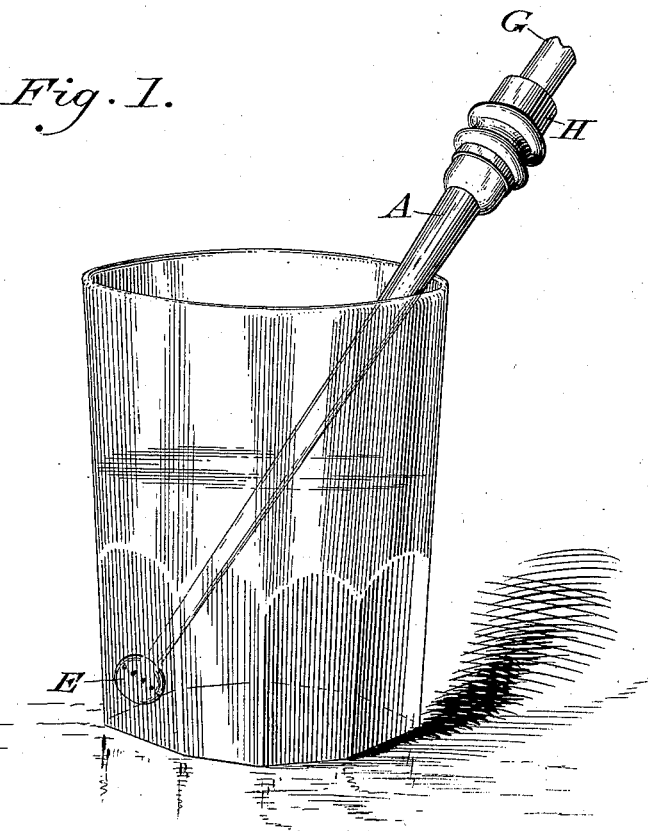
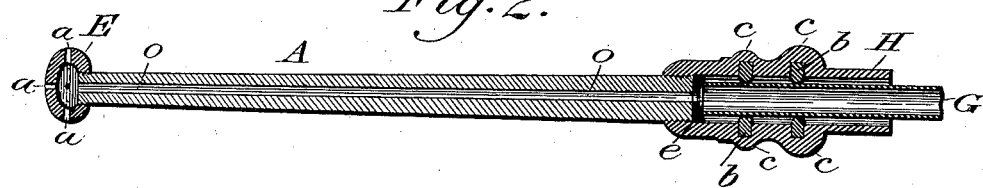
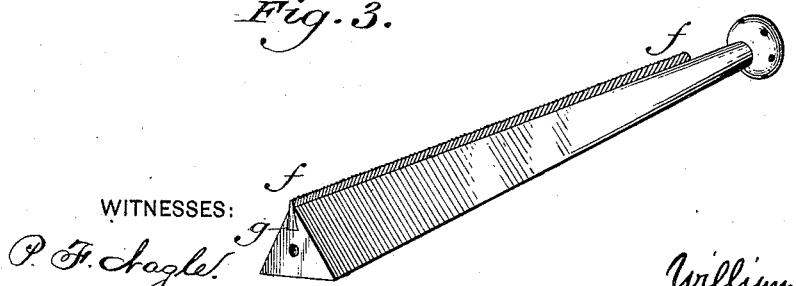
WITNESSES:
INVENTOR
William Alexander Bond,
by his attorney,
Horace Pettit.

UNITED STATES PATENT OFFICE.

WILLIAM ALEXANDER BOND, OF PHILADELPHIA, PENNSYLVANIA.

SIPHON OR SPIGOT EXTENSION OR SHANK.

SPECIFICATION forming part of Letters Patent No. 366,070, dated July 5, 1887.

Application filed October 30, 1886. Serial No. 217,561. (No model.)

*To all whom it may concern:*

Be it known that I, WILLIAM ALEXANDER BOND, of the city of Philadelphia and State of Pennsylvania, have invented a new and useful Improvement in a Siphon or Spigot Extension or Shank; and I do hereby declare the following to be a full, clear, and exact description thereof.

The object of my invention is to provide an extension to a siphon nozzle or spigot for the purpose of introducing water or other liquid charged with carbonic acid or other gas from a siphon bottle or jar, when desired to be applied to a drink or mixture of liquors or liquids, beneath the surface or at the bottom of the said liquors or liquids, instead of (as is usual) introducing it at the top. As is known or can be ascertained by experiment, the liquid containing the gas in being introduced from the siphon bottle or jar above or at the surface of the liquids into the glass containing the said liquors or liquids desired to be mixed or operated upon by the chemical properties of the gas-charged water or fluid does not properly intermix with the said liquors, nor cause them to properly intermix with each other in the manner desired, but has a tendency, especially in the case of the desired mixture of certain liquors or liquids—such as, for instance, whisky and soda—to allow them to remain partially or entirely unmixed, the one at the bottom and the other above, and not properly commixed or diffused with the carbonic acid or other gas thus introduced. In order to obviate this difficulty and to cause the liquors or liquids and the gas to be properly commixed, I have discovered that if the gas-charged water of the siphon bottle or jar is introduced below or at the bottom of the contents of the glass or other vessel containing the liquids or liquors the mixture desired will be properly attained and the gas or gases properly commingled and diffused. A difficulty, however, to be experienced in this method is that, if the contents of the siphon bottle or jar are directly introduced into the bottom of the glass in the same volume and force that it leaves the jar, a portion of the contents when full will be thrown over. It is therefore necessary, in contriving an extension apparatus or device for the purpose of introducing the gas-charged water or contents of the siphon-bottle below or at the bottom of the contents of the glass desired to be mixed, that this difficulty should also be overcome. My invention, hereinafter described, is so adjusted, contrived, and constructed as to not only introduce the said gas-charged water at the bottom of the liquors or liquids to be intermixed and diffused with the gas, but also to so introduce and diffuse the gas-charged liquid as to prevent the overflowing of the contents of the glass when full.

I am aware that devices for the purpose of introducing gas-charged water below the surface of liquors desired to be mixed have heretofore been invented, and do not claim such a device, broadly; but what I do claim as my invention is my improvement in a device for the purpose as herein described combining the material elements herein shown.

I will now describe my invention, so that others skilled in the art to which it appertains may apply the same, reference being had hereinafter to the accompanying drawings, forming part of this specification.

My invention consists in an extension or shank, constructed of metal or other desired material, having a longitudinal hole or orifice through the center. At the extreme or lower end is provided a perforated ball or knob, hollowed or rounded out on the inside and into which the longitudinal hole of the main shank enters. Connecting with and entering this rounded orifice are small holes or perforations, through which the gas-charged water or liquid is distributed or forced out in small streams or sprays. I employ about five of these small holes, one in the extreme end and the balance on the sides; but I do not limit myself to any number or size.

In devices heretofore used the method of distribution of the gas-charged or aerated water and the breaking of the direct force thereof is sought to be accomplished in a material and substantially different manner from that employed in my improved device. In my said improvement the force, after being first partially broken at the upper end of the shank proper, on leaving the siphon nozzle or spigot and entering the orifice of the shank, is thereafter materially lessened and broken on entering the hollow ball provided at the extremity, and thence distributed with the proper pressure through the perforations piercing the hollow chamber of the ball, the sum of the diameter of the perforations being greater than the diameter of the orifice of the shank.

The object of this device, as hereinbefore stated, is to break in a degree the force of the gas-charged water or contents of the siphon bottle or jar, so that on entering the glass or vessel containing the liquors or liquids to be mixed they will not be thrown over the sides, but at the same time, however, entering with sufficient force to thoroughly mix the contents and to diffuse the gas. The upper end of the shank proper, where it unites with the nozzle end and comes in contact with the end of the siphon nozzle or spigot, is so adjusted by reason of the orifice of the shank being of less diameter than that of the nozzle that the force of the gas-charged or aerated water is here primarily broken, and, on entering the enlarged orifice of the ball or knob is, as before stated, further broken therein, and consequently is distributed with less force through the small holes or perforations. The upper end, for the purpose of adjustment to the siphon nozzle or spigot, is enlarged to admit of the nozzle or spigot entering therein, and is provided with hollowed rings or grooves on the inner side, into which rings of rubber or other suitable material are fitted, of such size or sizes as to hold firmly the said extension-shank to the nozzle or spigot, and further so adjusted as to prevent the escape of the water-charged gas or liquid as it enters the extension-shank from the nozzle or spigot.

The orifice or hole for the insertion of the nozzle or spigot is constructed, as shown in the accompanying drawings, of such size or dimension as to allow of the nozzle fitting loosely into the said orifice, the rings or washers of rubber or other suitable material fitting tightly around the nozzle and holding the shank firmly thereto, as described. By reason of this space a portion of the gas-charged water on leaving the nozzle to enter the orifice of the shank is forced up between the outer surface of the nozzle and the walls of the nozzle-fitting orifice against the ring or washer, which, fitting tightly around the nozzle, forms a shoulder, and thereby the gas-charged water, having a tendency to drive the shank device up, holds the said shank to the nozzle more firmly automatically and prevents its being blown off.

I am aware that rings or washers of rubber have been heretofore employed for making and tightening joints, &c., in various devices, but not in the manner as herein described and claimed. The said extension-shank may be constructed in one piece and material, or the ball end may be made separately and adjusted to the main shank by a screw-thread or other desired method, as also may the enlarged nozzle-connecting end. Longitudinally on the shank, in a groove provided for the purpose, a small file is inserted and adjusted in such a manner that the file-edge protrudes beyond the surface of the shank and allows of the shank being used as a file when desired, as for the purpose of opening champagne-bottles, &c.

In the accompanying drawings similar letters refer to similar parts.

Figure 1 represents my invention in a glass as in position to be operated. Fig. 2 represents a longitudinal sectional view. Fig. 3 shows the device with the file attachment.

A represents the main shank, having the longitudinal hole or orifice O, and provided at the lower end with the hollowed ball or knob E, having the small holes or perforations $a$.

H is the enlarged upper or nozzle-fitting end into which the siphon nozzle or spigot G is adjusted.

$b\ b\ b\ b$ are the rings of rubber or other material fitted into the hollowed grooves $c\ c\ c\ c$, for the purpose of binding firmly and fixedly when in use the said shank or extension to the nozzle or spigot, while the end of the said nozzle or spigot rests against the ring or washer of cork or other suitable material, $e$.

$f\ f$ is the the file device adjusted to the main shank A by means of the groove $g$.

Having thus described my invention, what I claim, and desire to secure by Letters Patent, is—

A siphon-shank provided with a longitudinal hole having a hollowed chamber, ball-shaped end provided with perforations opposite the entrance of the main orifice into said hollowed chamber and at or about a diametrical line at right angles to the orifice of the shank, whereby the gas-charged or aerated water is diffused throughout the liquids and thoroughly mixes them, the sum of the perforations being greater than the area of the orifice of the shank, and a nozzle end provided with an orifice for the insertion of the nozzle, having rings or packing of rubber or other suitable material, in the manner and for the purposes substantially as hereinbefore set forth and described.

In testimony whereof I have hereunto set my hand this 28th day of October, A. D. 1886.

WILLIAM ALEXANDER BOND.

Witnesses:
 HORACE PETTIT,
 ISAIAH MATLACK.